(12) United States Patent
Xiang et al.

(10) Patent No.: US 12,073,049 B2
(45) Date of Patent: Aug. 27, 2024

(54) DISPLAY PANEL AND DISPLAY APPARATUS WITH ADDITIONAL ELECTRODE LAYER FOR IMPROVING MUTUAL CAPACITANCE VARIATION

(71) Applicant: BOE TECHNOLOGY GROUP CO., LTD., Beijing (CN)

(72) Inventors: Dalin Xiang, Beijing (CN); Yuanyuan Li, Beijing (CN); Zewen Bo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 130 days.

(21) Appl. No.: 17/770,029

(22) PCT Filed: Jul. 23, 2021

(86) PCT No.: PCT/CN2021/108135
§ 371 (c)(1),
(2) Date: Apr. 18, 2022

(87) PCT Pub. No.: WO2022/017499
PCT Pub. Date: Jan. 27, 2022

(65) Prior Publication Data
US 2022/0391042 A1 Dec. 8, 2022

(30) Foreign Application Priority Data

Jul. 24, 2020 (CN) .......................... 202010720017.X
Sep. 28, 2020 (CN) .......................... 202011042892.3

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0448* (2019.05);
(Continued)

(58) Field of Classification Search
CPC . G06F 3/044–0448; G06F 2203/04107; G06F 2203/04111; G06F 2203/04112
See application file for complete search history.

(56) References Cited

U.S. PATENT DOCUMENTS

2018/0348902 A1* 12/2018 Zhang ................. G06F 3/04164
2020/0210025 A1* 7/2020 Kim ...................... G06F 3/0448

* cited by examiner

*Primary Examiner* — Roberto W Flores
(74) *Attorney, Agent, or Firm* — HOUTTEMAN LAW LLC

(57) ABSTRACT

The present disclosure provides a display panel and a display apparatus. The display panel includes: a display substrate; a touch electrode layer on a light outgoing side of a display substrate and including at least one first electrode and at least one second electrode, which intersect with each other and are insulated from each other; an additional electrode layer in a layer different from the touch electrode layer and including at least one first additional electrode, wherein an orthographic projection of the at least one first additional electrode on the display substrate at least partially overlaps an orthographic projection of a corresponding first electrode on the display substrate; and an insulating layer between the additional electrode layer and the touch electrode layer; wherein the at least one first additional electrode is connected to the corresponding first electrode through at least one first via in the insulating layer.

20 Claims, 8 Drawing Sheets

(52) U.S. Cl.
CPC ............... *G06F 2203/04111* (2013.01); *G06F 2203/04112* (2013.01)

DISPLAY PANEL AND DISPLAY APPARATUS WITH ADDITIONAL ELECTRODE LAYER FOR IMPROVING MUTUAL CAPACITANCE VARIATION

CROSS REFERENCE TO RELATED APPLICATIONS

The present application claims priorities of the Chinese Patent Application No. 202010720017.X filed on Jul. 24, 2020 and the Chinese Patent Application No. 202011042892.3 filed on Sep. 28, 2020, the contents of which are incorporated herein by reference in its entirety.

TECHNICAL FIELD

The present disclosure relates to the field of display technology, in particular to a display panel and a display apparatus.

BACKGROUND

Currently, a touch function is generally required to be integrated in an OLED (Organic Light-Emitting Diode) display technology. Specifically, touch display of the OLED display panel may be implemented by forming touch electrodes on an OLED display substrate.

SUMMARY

In a first aspect of the present disclosure, the present disclosure provides a display panel, including: a display substrate; and a touch electrode layer, which is arranged on a light outgoing side of the display substrate, and includes at least one first electrode and at least one second electrode, which intersect with each other and are insulated from each other; wherein the display panel further includes: an additional electrode layer, which is arranged in a layer different from the touch electrode layer and includes at least one first additional electrode; wherein an orthographic projection of the at least one first additional electrode on the display substrate at least partially overlaps an orthographic projection of the at least one first electrode on the display substrate; and an insulating layer, which is arranged between the additional electrode layer and the touch electrode layer; wherein the at least one first additional electrode is connected to the at least one first electrode through at least one first via in the insulating layer.

In some embodiments of the present disclosure, the additional electrode layer further includes at least one second additional electrode, which is insulated from the at least one first additional electrode; and an orthographic projection of the at least one second additional electrode on the display substrate at least partially overlaps the orthographic projection of the at least one second electrode on the display substrate, and the at least one second additional electrode is connected to the at least one second electrode through at least one second via in the insulating layer.

In some embodiments of the present disclosure, the orthographic projection of the at least one first electrode on the display substrate includes a first edge region, and the orthographic projection of the at least one first additional electrode on the display substrate overlaps the first edge region; and the orthogonal projection of the at least one second electrode on the display substrate includes a second edge region, and the orthogonal projection of the at least one second additional electrode on the display substrate overlaps the second edge region.

In some embodiments of the present disclosure, the additional electrode layer further includes at least one bridge portion; and the at least one bridge portion is connected to the at least one first additional electrode; the at least one first electrode includes two first electrode blocks at both sides of one of the at least one second electrode; the at least one bridge portion electrically connects the two first electrode blocks together through at least two third vias in the insulating layer; or the at least one bridge portion is connected to the at least one second additional electrode; the at least one second electrode includes two second electrode blocks at both sides of one of the at least one first electrode; the at least one bridge portion electrically connects the two second electrode blocks together through at least two third vias in the insulating layer.

In some embodiments of the present disclosure, the at least one first via includes a plurality of first vias, and orthographic projections of the plurality of first vias on the display substrate are uniformly distributed in an area where the orthographic projection of the at least one first additional electrode on the display substrate overlaps the orthographic projection of the at least one first electrode on the display substrate.

In some embodiments of the present disclosure, the at least one second via includes a plurality of second vias, and orthographic projections of the plurality of second vias on the display substrate are uniformly distributed in an area where the orthographic projection of the at least one second additional electrode on the display substrate overlaps the orthographic projection of the at least one second electrode on the display substrate.

In some embodiments of the present disclosure, the at least one first additional electrode includes a plurality of first additional electrodes, and orthographic projection of the plurality of first additional electrodes on the display substrate are distributed on a part of the first edge region or the whole first edge region of the orthographic projection of the at least one first electrode on the display substrate.

In some embodiments of the present disclosure, the at least one second additional electrode includes a plurality of second additional electrodes, and orthographic projection of the plurality of second additional electrodes on the display substrate are distributed on a part of the second edge region or the whole second edge region of the orthographic projection of the at least one second electrode on the display substrate.

In some embodiments of the present disclosure, the orthographic projection of the at least one first additional electrode on the display substrate fully overlaps the orthographic projection of the at least one first electrode on the display substrate.

In some embodiments of the present disclosure, the orthographic projection of the at least one second additional electrode on the display substrate fully overlaps the orthographic projection of the at least one second electrode on the display substrate.

In some embodiments of the present disclosure, the touch electrode layer includes a plurality of sub-units arranged in an array along a first direction and a second direction; and each of the plurality of sub-units includes at least one first electrode and at least one second electrode, which include a plurality of first inter-digital electrodes and a plurality of second inter-digital electrodes, respectively, extending along the first direction and alternately arranged in the second direction.

In some embodiments of the present disclosure, the additional electrode layer includes bridge portions, and each of the plurality of sub-units corresponds to one of the bridge portions.

In some embodiments of the present disclosure, the at least one first electrode and the at least one second electrode are mesh-shaped; the additional electrode layer is mesh-shaped.

In some embodiments of the present disclosure, each of the at least one first electrode and the at least one second electrode is made of a titanium/aluminum/titanium laminated material.

In some embodiments of the present disclosure, the additional electrode layer is made of a titanium/aluminum/titanium laminated material.

In some embodiments of the present disclosure, the insulating layer is made of a silicon nitride material or silicon oxide material.

In some embodiments of the present disclosure, a mesh located at a boundary between the at least one first electrode and the at least one second electrode includes a plurality of metal wires, any two adjacent of which have a fracture therebetween, such that the at least one first electrode and the at least one second electrode are electrically insulated from each other.

In some embodiments of the present disclosure, the display panel further includes a plurality of first floating electrodes; wherein the plurality of first floating electrodes and the touch electrode layer are in a same layer and spaced apart from each other and insulated from each other; and wherein the plurality of first floating electrodes are floated.

In some embodiments of the present disclosure, the display panel further includes at least one second floating electrode; wherein the at least one second floating electrode and the additional electrode layer are in a same layer, and insulated from each other; an orthographic projection of the at least one second floating electrode and the additional electrode layer on the display substrate overlaps an orthographic projection of the plurality of first floating electrodes and the touch electrode layer on the display substrate.

In a second aspect of the present disclosure, there is also provided a display apparatus including the display panel according to any one of the embodiments of the first aspect of the present disclosure.

Reference numbers are:
1. display substrate; 2. touch electrode layer; 21. first electrode; 210. first electrode block; 22. second electrode; 211. edge region; 23. bridge portion; 200. sub-unit; 3. additional electrode layer; 31. first additional electrode; 32. second additional electrode; 4. insulating layer; 41. first via; 42. second via; 43. third via; 5. planarization layer; 6. first transparent adhesive layer; 7. polarizer; 8. second transparent adhesive layer; 9. cover plate; 10. first floating electrode. 22. second electrode; 220. second electrode block; 221. connection electrode; 11. second floating electrode. 300. fracture.

DETAIL DESCRIPTION OF EMBODIMENTS

In order to enable one of ordinary skill in the art to better understand the technical solutions of the present disclosure, a display panel and a display apparatus of the present disclosure are further described in detail below with reference to the accompanying drawings and the detailed description.

A capacitance variation between a driving electrode and a sensing electrode in a mutual capacitance type touch is an important parameter which affects the touch performance. Films on a touch electrode in an OLED display panel become thicker, or a touch electrode has a larger load due to a larger capacitance formed between the touch electrode and a metal film (e.g., a cathode) located below the touch electrode, so that a mutual capacitance variation of the touch electrode during a mutual capacitance touch is very small. For example, a mutual capacitance variation between an active pen and a touch screen is only several femtoFaradays (fF). These small variations not only affect touch performances such as touch accuracy, linearity, jitter, etc., but also are easily covered by various interferences in an external environment, so that a touch chip (Touch IC) cannot detect whether the touch occurs.

In view of the problem that the film on the touch electrode is thicker or the load of the touch electrode is larger, so that the mutual capacitance variation during the touch is very small and thus, it is difficult to detect whether the touch occurs, the present disclosure provides a display panel and a display apparatus. In the display panel provided by the present disclosure, an additional electrode layer is provided, such that the mutual capacitance variation of the display panel during the touch is increased, and the touch sensitivity and accuracy of the display panel are improved.

Figure 1:
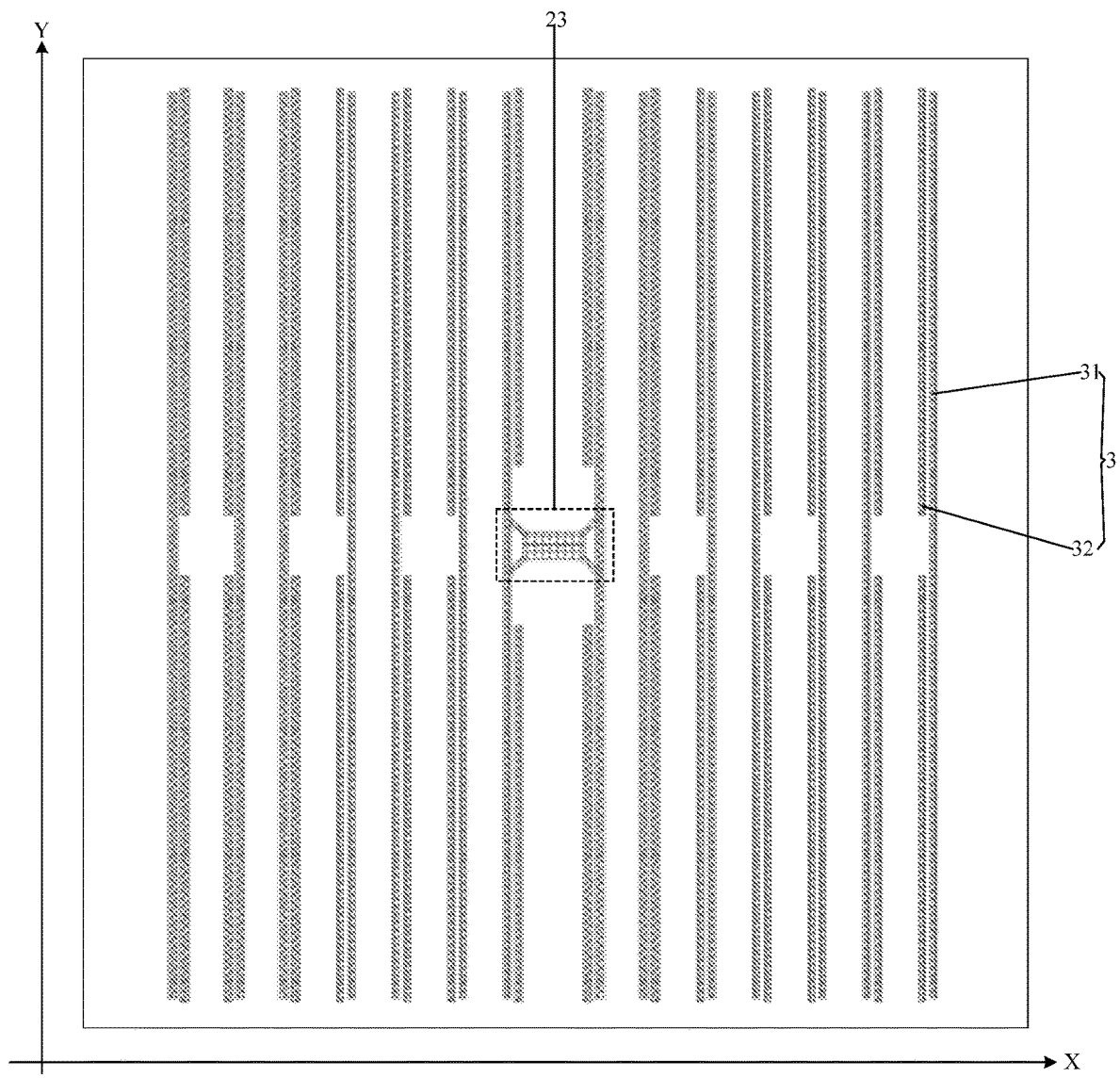
FIG. 1 is a schematic top view illustrating a structure of an additional electrode layer in a display panel according to an embodiment of the present disclosure.
Figure 2:
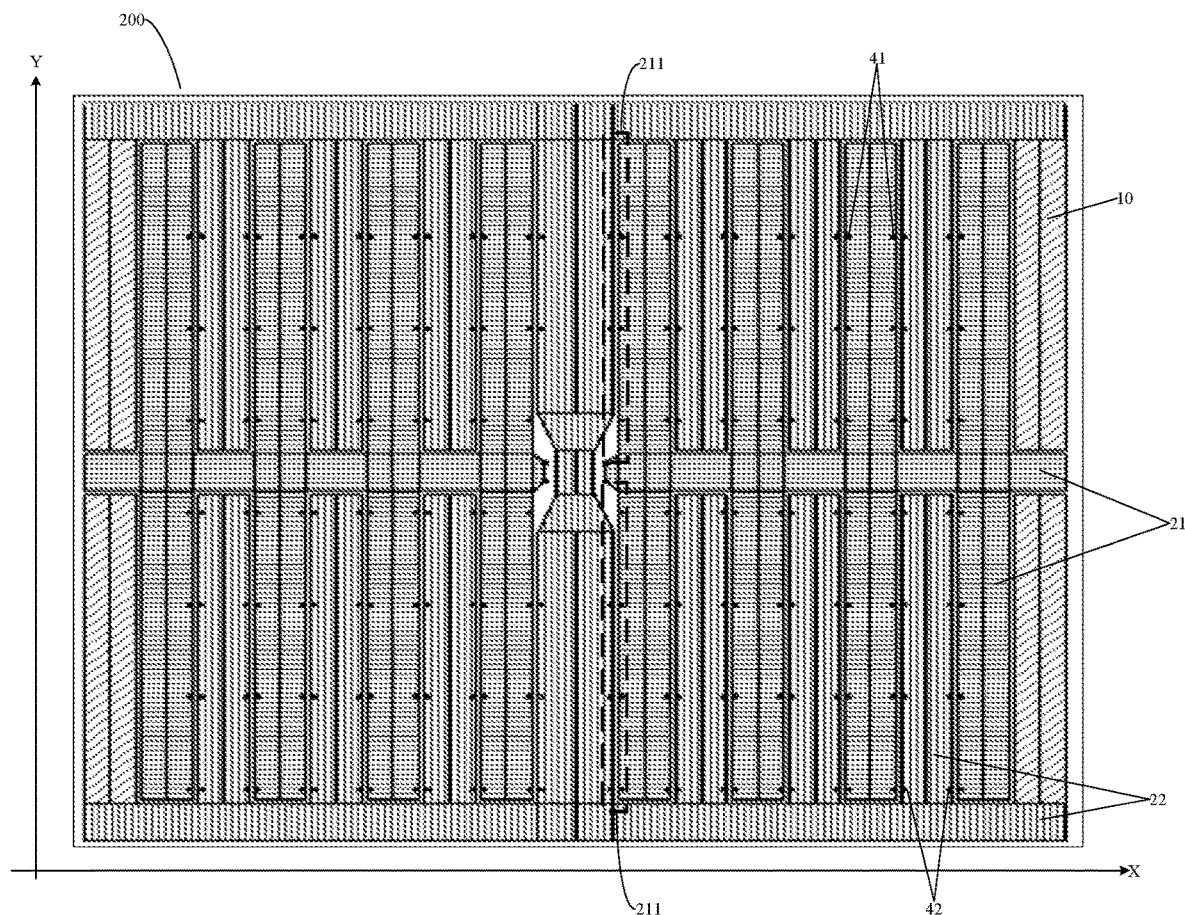
FIG. 2 is a schematic top view illustrating a structure of a touch electrode layer in a display panel according to an embodiment of the present disclosure.
Figure 3:
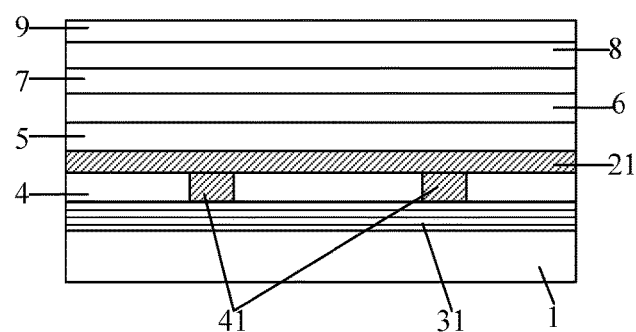
FIG. 3 is a schematic cross-sectional view illustrating a structure of a display panel according to an embodiment of the present disclosure.

FIG. 1 is a schematic top view illustrating a structure of an additional electrode layer in a display panel according to an embodiment of the present disclosure; FIG. 2 is a schematic top view illustrating a structure of a touch electrode layer in a display panel according to an embodiment of the present disclosure; FIG. 3 is a schematic cross-sectional view illustrating a structure of a display panel according to an embodiment of the present disclosure. As shown in FIGS. 1 to 3, a display panel in the embodiment of the present disclosure includes: a display substrate 1 and a touch electrode layer 2 arranged on a light outgoing side of the display substrate 1, wherein the touch electrode layer 2 includes at least one first electrode 21 and at least one second electrode 22, which intersect with each other and are insulated from each other. The display panel further includes an additional electrode layer 3, which is arranged in a layer different from the touch electrode layer 2, and includes at least one first additional electrode 31; an orthographic projection of the at least one first additional electrode 31 on the display substrate 1 at least partially overlaps an orthographic projection of the at least one first electrode 21 on the display substrate 1. An insulating layer 4 is arranged between the additional electrode layer 3 and the touch electrode layer 2; the at least one first additional electrode 31 is connected to a corresponding first electrode 21 through at least one first via 41 in the insulating layer 4.

In some embodiments of the present disclosure, the at least one first additional electrode 31 is connected in parallel with the corresponding first electrode 21 through at least one first via 41 in the insulating layer 4. In some embodiments of the present disclosure, the at least one first via is provided in the insulating layer 4, and the reference number 41 shown in FIG. 2 only indicates a positional relationship between the first via and the touch electrode layer 2.

In some embodiments of the present disclosure, the orthographic projection of the at least one first electrode 21 on the display substrate 1 includes a first edge region, and the orthographic projection of the at least one first additional electrode 31 on the display substrate 1 overlaps the first edge region.

Optionally, the additional electrode layer 3 further includes at least one second additional electrode 32, which is insulated from the at least one first additional electrode 31. The at least one second additional electrode 32 is connected to a corresponding second electrode 22 through at least one second via 42 in the insulating layer 4. An orthographic projection of the at least one second additional electrode 32 on the display substrate 1 at least partially overlaps an orthographic projection of the corresponding second electrode 22 on the display substrate 1. The at least one second additional electrode 32 is connected to the corresponding second electrode 22 through at least one second via 42 in the insulating layer 4.

In some embodiments of the present disclosure, the orthogonal projection of the at least one second electrode 22 on the display substrate 1 includes a second edge region, and the orthogonal projection of the at least one second additional electrode 32 on the display substrate 1 overlaps the second edge region.

FIG. 2 shows edge regions 211, each of which includes the first edge region and the second edge region.

In some embodiments of the present disclosure, each edge region 211 extends along a first direction (Y direction) or a second direction (X direction). For example, the edge region 211 shown in FIG. 2 includes an edge of one first electrode 21 and an edge of one second electrode 22. FIG. 2 only shows the edge region 211 extending in the Y direction, and an edge region extending in the X direction is not shown. As shown in FIGS. 1 and 2, the first direction Y and the second direction X are perpendicular to each other in a plane where the display panel is located (a plane of the display panel).

In some embodiments of the present disclosure, the at least one first electrode 21 is a driving electrode, and the at least one second electrode 22 is a sensing electrode. Alternatively, the at least one first electrode 21 is a sensing electrode and the at least one second electrode 22 is a driving electrode. The at least one first electrode 21 and the at least one second electrode 22 intersect with each other and are insulated from each other, thereby achieving a mutual capacitance touch. In the edge region 211, electric wires between the first electrode 21 and the second electrode 22 are relatively dense, so that the capacitance variation between the first electrode 21 and the second electrode 22 is relatively great during the touch. Therefore, the electric wires at the edge region 211 are increased, which may improve the touch sensitivity of the display panel.

The additional electrode layer 3 is disposed in a layer different from the touch electrode layer 2, and an orthogonal projection of the at least one first additional electrode 31 on the display substrate 1 at least partially overlaps an orthogonal projection of the corresponding first electrode 21 on the display substrate 1, and the at least one first additional electrode 31 in the additional electrode layer 3 is connected to the corresponding first electrode 21. In this way, the number of electric wires of the first electrode 21 and the second electrode 22 at the edge region 211 is increased, so that an electric field of the first electrode 21 and the second electrode 22 at the edge region 211 is enhanced, and further, the mutual capacitance variation between the first electrode 21 and the second electrode 22 during the touch is increased. Furthermore, the touch sensitivity of the display panel is improved, and the problems are solved or avoided that the films on the touch electrode layer 2 become thicker or the load of the touch electrode layer 2 is larger, so that the mutual capacitance variation is very small and thus, it is difficult to detect whether the touch occurs. On the other hand, the at least one first additional electrode 31 is connected in parallel with the corresponding first electrode 21, so that the overall resistance of the display panel is reduced, and further, the path resistances of the first electrode 21 and the second electrode 22 are reduced along an extending direction of the first electrode 21, a difference between a product of a resistance and a capacitance at one end of the first electrode 21 and a product of a resistance and a capacitance at the other end of the first electrode 21 is reduced, the uniformity of electrical signals throughout the first electrode 21 is improved, thereby improving touch performances, such as linearity, accuracy, report rate, floating performance and the like, of the touch electrode.

Optionally, the at least one first via 41 includes a plurality of first vias 41. Orthographic projections of the plurality of first vias 41 on the display substrate 1 are uniformly distributed in the area where the orthographic projection of the at least one first additional electrode 31 on the display substrate 1 overlaps the orthographic projection of the corresponding first electrode 21 on the display substrate 1. The plurality of first vias 41 are provided, which ensures the robustness of the electrical connection between the first additional electrode 31 and the corresponding first electrode 21. In addition, the first additional electrode 31 is connected in parallel with the corresponding first electrode 21, so that the overall resistance of the display panel is reduced, and the touch performance of the touch electrode is improved. Meanwhile, a larger process margin may be reserved in the process for manufacturing the first vias 41, the process difficulty is reduced, and the yield is improved.

In the embodiment of the present disclosure, as shown in FIGS. 1 and 2, the first electrodes 21, the first additional electrodes 31 and the first vias 41 are correspondingly disposed.

The at least one second additional electrode 32 in the additional electrode layer 3 is connected to the corresponding second electrode 22. In this way, the number of electric wires of the first electrode 21 and the second electrode 22 at the edge region 211 is further increased, so that an electric field of the first electrode 21 and the second electrode 22 at the edge region 211 is further enhanced, and further, the mutual capacitance variation between the first electrode 21 and the second electrode 22 during the touch is increased. Furthermore, the touch sensitivity of the display panel is improved, and the problems are further solved or avoided that the films on the touch electrode layer 2 become thicker or the load of the touch electrode layer 2 is larger, so that the mutual capacitance variation is very small and thus, it is difficult to detect whether the touch occurs. On the other hand, the at least one second additional electrode 32 is connected in parallel with the corresponding second electrode 22, so that the overall resistance of the display panel is reduced, and further, the path resistances of the first electrode 21 and the second electrode 22 are reduced along an extending direction of the second electrode 22, a difference between a product of a resistance and a capacitance at one end of the second electrode 22 and a product of a resistance and a capacitance at the other end of the second electrode 22 is reduced, the uniformity of electrical signals throughout the second electrode 22 is improved, thereby improving touch performances, such as linearity, accuracy, report rate, floating performance and the like, of the touch electrode.

In some embodiments of the present disclosure, the display panel includes at least one first additional electrode 31 and at least one second additional electrode 32, and includes at least one first electrode 21 and at least one second electrode 22. However, the present disclosure is not limited thereto. In other embodiments of the present disclosure, the display panel includes a plurality of first additional electrodes 31 and a plurality of second additional electrodes 32, and includes a plurality of first electrodes 21 and a plurality of second electrodes 22, as shown in FIGS. 1 and 2.

In some embodiments of the present disclosure, the at least one second additional electrode 32 is connected in parallel with the corresponding second electrode 22 through the at least one second via 42 in the insulating layer 4. In some embodiments of the present disclosure, the at least one second via 42 is provided in the insulating layer 4, and the reference number 42 shown in FIG. 2 only represents a positional relationship between the second via and the touch electrode layer 2.

Optionally, the at least one second via 42 includes a plurality of second vias 42. Orthographic projections of the plurality of second vias 42 on the display substrate 1 are uniformly distributed in the area where the orthographic projection of the at least one second additional electrode 32 on the display substrate 1 overlaps the orthographic projection of the corresponding second electrode 22 on the display substrate 1. The plurality of second vias 42 are provided, which ensures the robustness of the electrical connection between the second additional electrode 32 and the corresponding second electrode 22. In addition, the second additional electrode 32 is connected in parallel with the corresponding second electrode 22, so that the overall resistance of the display panel is reduced, and the touch performance of the touch electrode is improved. Meanwhile, a larger process margin may be reserved in the process for manufacturing the second vias 42, the process difficulty is reduced, and the yield is improved.

In the embodiment of the present disclosure, as shown in FIGS. 1 and 2, the second electrodes 22, the second additional electrodes 32 and the second vias 42 are correspondingly disposed.

It should be noted that in this embodiment, the additional electrode layer 3 is provided on the display substrate 1. Alternatively, the additional electrode layer 3 may also be disposed on a side of the touch electrode layer 2 away from the display substrate 1.

It should be noted that, the additional electrode layer 3 may be provided with only the at least one first additional electrode 31 or only the at least one second additional electrode 32. Alternatively, the additional electrode layer 3 may also be provided with both the at least one first additional electrode 31 and the at least one second additional electrode 32, as shown in FIG. 1.

Optionally, the display substrate 1 includes a back plate provided with a driving circuit, an array of sub-pixels disposed on the back plate, and an encapsulation layer for encapsulating the sub-pixels. The display substrate 1 further includes a buffer layer, which is arranged on the encapsulation layer, and the buffer layer is favorable for forming the touch electrode layer 2 thereon. In some embodiments of the present disclosure, the sub-pixels may be OLED light emitting elements, and may alternatively be LED or Micro LED light emitting elements.

Optionally, the display panel further includes a planarization layer 5, a first transparent adhesive layer 6, a polarizer 7, a second transparent adhesive layer 8, and a cover plate 9, which are sequentially disposed on a side of the touch electrode layer 2 away from the display substrate 1. The first transparent adhesive layer 6 is used for adhering the planarization layer 5 and the polarizer 7 together; the second transparent adhesive layer 8 is used for adhering the polarizer 7 and the cover plate 9 together. The polarizer 7 is used for reducing the reflectivity of the display panel for light. The planarization layer 5 has a thickness in a range of 0.1 μm to 20 μm.

Figure 4:
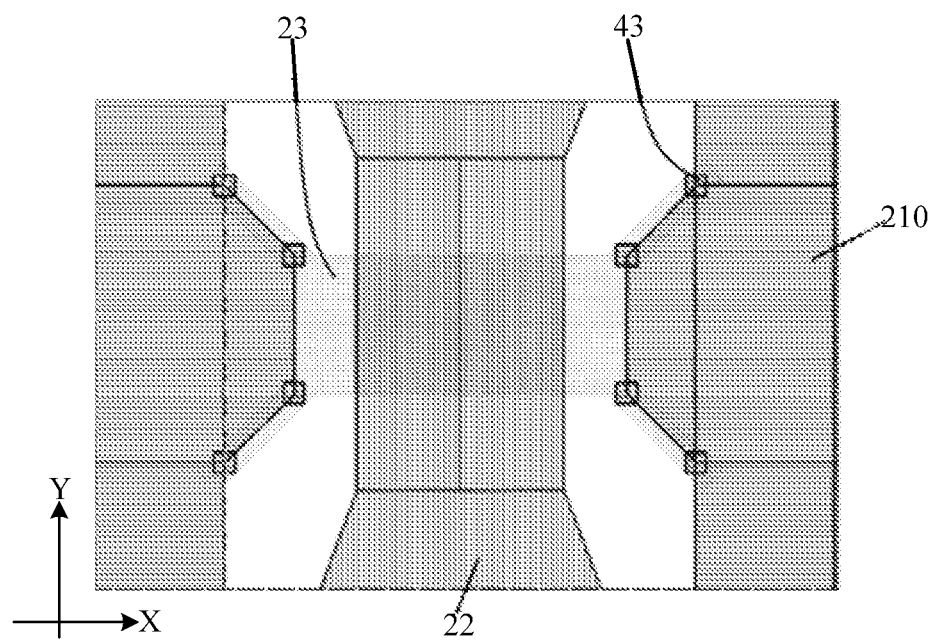
FIG. 4 is a schematic top view illustrating a structure at a position of a bridge portion in a display panel according to an embodiment of the present disclosure.

Optionally, the at least one first electrode 21 and the at least one second electrode 22 are provided in a same layer. As shown in FIGS. 1 and 4, the additional electrode layer 3 further includes at least one bridge portion 23, and an orthogonal projection of the at least one bridge portion 23 on the display substrate 1 is located in an orthogonal projection of a position, where the at least one first electrode 21 and the at least one second electrode 22 intersect with each other, on the display substrate 1. The at least one bridge portion 23 is connected to the at least one first additional electrode 31. The at least one first electrode 21 includes two first electrode blocks 210 located at two opposite sides of one of the at least one second electrode 22. The at least one bridge portion 23 electrically connects the two first electrode blocks 210 together through at least two third vias 43 provided in the insulating layer 4.

Alternatively, the at least one bridge portion is connected to the at least one second additional electrode. The at least one second electrode includes two second electrode blocks located at two opposite sides of one of the at least one first electrode. The at least one bridge portion electrically connects the two second electrode blocks together through at least two third vias provided in the insulating layer (not shown in the drawings).

Optionally, the at least one first electrode 21 and the at least one second electrode 22 are provided in a same layer.

As shown in FIG. 4, the additional electrode layer 3 further includes at least one bridge portion 23, and an orthogonal projection of the at least one bridge portion 23 on the display substrate 1 is located in an orthogonal projection of a position, where the at least one first electrode 21 and the at least one second electrode 22 intersect with each other, on the display substrate 1. The at least one bridge portion 23 is electrically connected to the at least one first additional electrode 31. The at least one first electrode 21 includes two first electrode blocks 210 extending in the X direction and located on two opposite sides of one of the at least one second electrode 22. The at least one bridge portion 23 electrically connects the two first electrode blocks 210 together through at least two third vias 43 provided in the insulating layer 4.

Alternatively, the at least one bridge portion is electrically connected to the at least one second additional electrode. The at least one second electrode includes two second electrode blocks extending in the Y direction and located on two opposite sides of one of the at least one first electrode. The at least one bridge portion electrically connects the two second electrode blocks together through at least two third vias provided in the insulating layer (not shown in the drawings).

Figure 5:
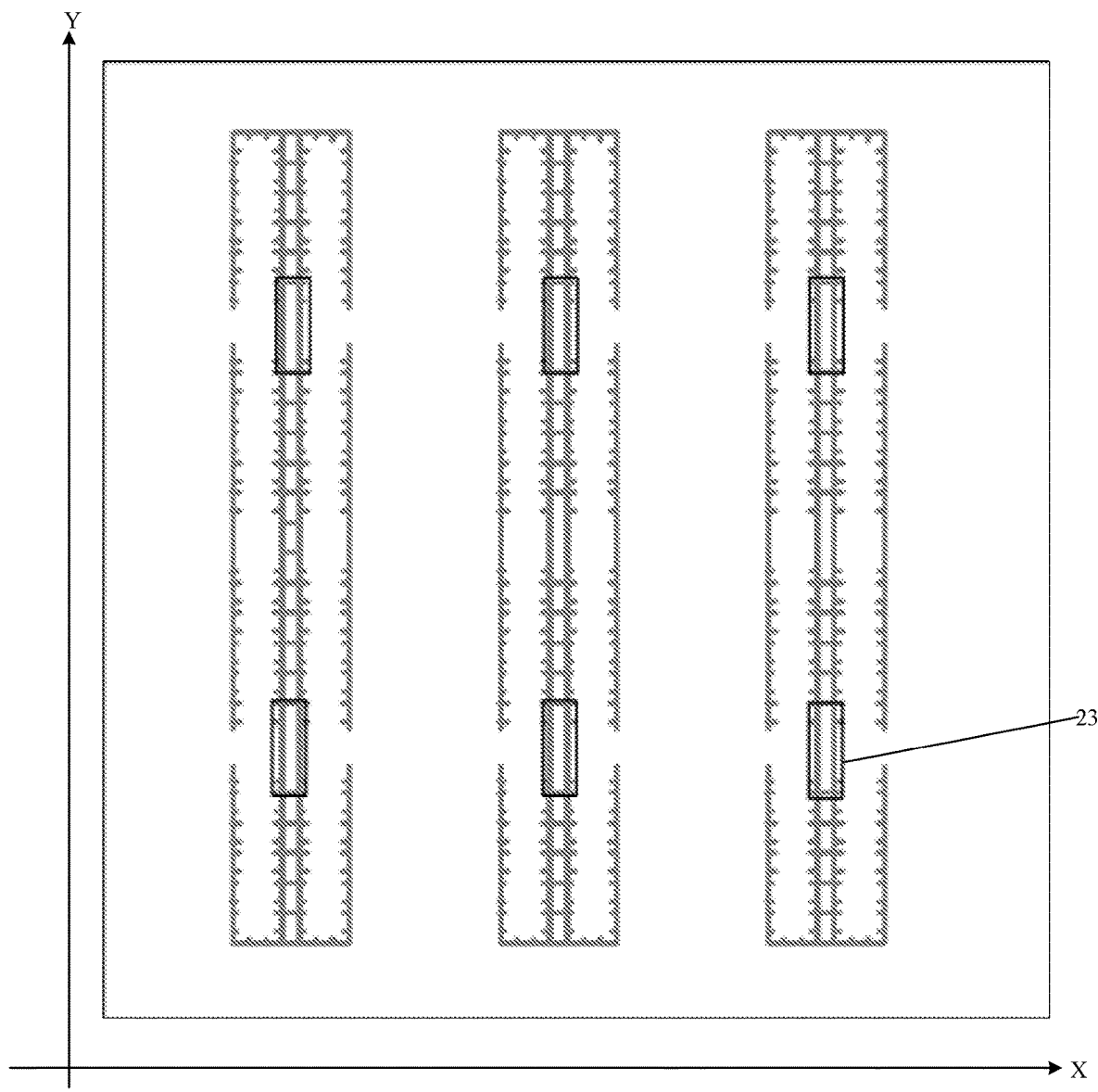
FIG. 5 is a schematic top view illustrating a structure of an additional electrode layer in another display panel according to an embodiment of the present disclosure.
Figure 6:
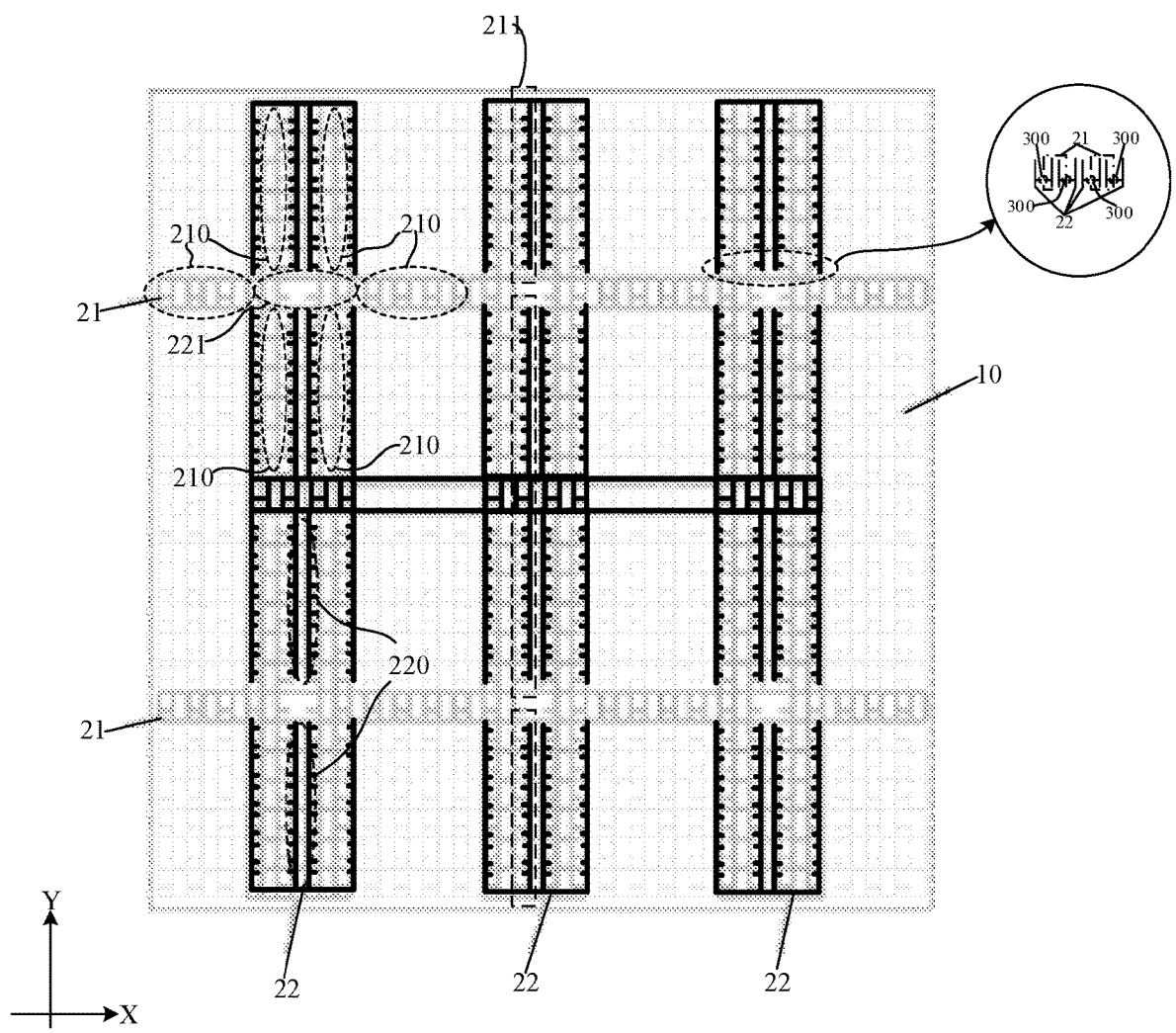
FIG. 6 is a schematic top view illustrating a structure of a touch electrode layer in another display panel according to an embodiment of the present disclosure.

Specifically, in the embodiment of the present disclosure, as shown in FIGS. 1 and 2, the at least one first electrode 21 is disconnected at the middle of each sub-unit 200, and thus, the at least one first electrode 21 is divided into two portions (i.e., the first electrode blocks 210), while the at least one second electrode 22 is not disconnected. In other embodiments of the present disclosure, as shown in FIGS. 5 and 6, the at least one first electrode 21 may be not disconnected at the middle of each sub-unit 200, while the at least one second electrode 22 is disconnected at the middle of each sub-unit 200, such that the second electrode 22 includes two portions (i.e., the second electrode blocks 220). In the embodiment of the present disclosure, the at least one bridge portion 23 is disposed at a position corresponding to a position where the first electrode 21 or the second electrode 22 in the touch electrode layer 2 is disconnected, such that an orthographic projection of the at least one bridge portion 23 on the display substrate 1 is located at the position where the first electrode 21 or the second electrode 22 is disconnected. Further, in a case where the at least one second electrode 22 is disconnected at the middle, the at least one bridge portion 23 is connected to the at least one first additional electrode 31 and electrically connects the two adjacent second electrode blocks 220 together through the third vias 43 in the insulating layer 4. Alternatively, in the case where the at least one first electrode 21 is disconnected at the middle, the at least one bridge portion 23 is connected to the at least one second additional electrode 32 and electrically connects the two adjacent first electrode blocks together through third vias in the insulating layer.

In some embodiments of the present disclosure, as shown in FIG. 1, the display panel includes a plurality of first additional electrodes 31 and a plurality of second additional electrodes 32 disposed in the additional electrode layer 3 and arranged in the X direction, wherein each of the first additional electrodes 31 and each of the second additional electrodes 32 extend in the Y direction; the plurality of first additional electrodes 31 are disposed in pairs, and the plurality of second additional electrodes 32 are disposed in pairs; each pair of first additional electrodes 31 is arranged in the X direction; one second additional electrode 32 is provided on each of two opposite sides in each pair of first additional electrodes 31; wherein each second additional electrode 32 is disconnected at a position corresponding to the bridge portion 23 in a length direction of the second additional electrode 32. In some embodiments of the present disclosure, as shown in FIG. 1, the display panel includes seven pairs of first additional electrodes 31 and seven pairs of second additional electrodes 32.

In some embodiments of the present disclosure, as shown in FIGS. 1 and 2, the display panel includes a plurality of first electrodes 21 and a plurality of second electrodes 22 disposed in the touch electrode layer 2, and each first electrode 21 and each second electrode 22 correspond to a pair of first additional electrodes 31 and a pair of second additional electrodes 32, respectively. Specifically, as shown in FIGS. 1 and 2, orthographic projections of a pair of first additional electrodes 31 on the display substrate 1 are located on two opposite sides of orthographic projection of two adjacent first electrodes 21 on the display substrate 1 in a width direction (the X direction); orthographic projections of a pair of second additional electrodes 32 on the display substrate 1 are located on two opposite sides of an orthographic projection of one second electrode 22 on the display substrate 1 in a width direction (the X direction). In some embodiments of the present disclosure, the touch electrode layer 2 further includes a plurality of first floating electrodes 10 extending along the Y direction, which are respectively located at the outermost sides of the touch electrode layer 2.

As shown in FIG. 2, the display panel includes eight first electrodes 21 extending in the Y direction and seven second electrodes 22 extending in the Y direction, wherein the outermost two first additional electrodes 31 in the additional electrode layer 3 are connected to a side of each of the outermost two first electrodes 21 close to the corresponding second electrode 22, respectively; there is no first additional electrodes 31 connected to a side of each of the outermost two first electrodes 21 close to the corresponding first floating electrode 10.

In addition, as shown in FIG. 2, the touch electrode layer 2 further includes a first electrode 21 extending in the X direction and intersecting with each of the plurality of first electrodes 21 extending in the Y direction, and the first electrode 21 extending in the X direction is disconnected at a position corresponding to a bridge portion 23 and divides each of the plurality of second electrodes 22 extending in the Y direction into two portions (i.e., an upper portion and a lower portion), which correspond to the disconnected second additional electrode 32, respectively. As shown in FIG. 2, the first electrode 21 extending in the X direction is disconnected at a position corresponding to the bridge portion 23 (i.e., the first electrode 21 extending in the X direction includes the first electrode blocks 210), while the second electrode 22 extending in the Y direction and passing through the position corresponding to the bridge portion 23 is not disconnected. However, the present disclosure is not limited thereto. In other embodiments of the present disclosure, the first electrode 21 extending in the X direction is not disconnected at the position corresponding to the bridge portion 23, while the second electrode 22 extending in the Y direction and passing through the position corresponding to the bridge portion 23 is disconnected (i.e., the second electrode 22 includes the second electrode blocks 220). As shown in FIG. 6, in each of the sub-units 200, the corresponding first electrode 21 and second electrode 22 are disposed in such a manner.

In some embodiments of the present disclosure, as shown in FIGS. 1 to 4, the bridge portion 23 has a length direction coinciding with the X direction and a width direction coinciding with the Y direction; the bridge portion 23 is electrically connected to the two adjacent first electrode blocks 210 in the X direction, respectively, through a plurality of third vias 43 in the insulating layer 4 (that is, the bridge portion 23 electrically connects two portions of the first electrode 21 extending in the X direction, which is disconnected at the position corresponding to the bridge portion 23, together through the plurality of third vias 43 in the insulating layer 4). However, the present disclosure is not limited thereto. In other embodiments of the present disclosure, the width direction of the bridge portion 23 coincides with the X direction, and the length direction of the bridge portion 23 coincides with the Y direction; the bridge portion 23 is electrically connected to two adjacent second electrode blocks 220 in the Y direction, respectively, through the plurality of third vias 43 in the insulating layer 4 (i.e., the bridge portion 23 electrically connects two portions of the second electrode 22 extending in the Y direction, which is disconnected at the position corresponding to the bridge portion 23, together through the plurality of third vias 43 in the insulating layer 4). As shown in FIGS. 5 and 6, in each of the sub-units 200, the corresponding bridge portion 23 and the disconnected second electrode 22 are disposed in such a manner.

The first direction Y and the second direction X intersect with each other. The first direction Y and the second direction X may be perpendicular to each other or may not be perpendicular to each other.

It should be noted that compared with the case where the at least one first electrode 21, the at least one second electrode 22 and the additional electrode layer 3 may be provided in three different layers, respectively, when the at least one first electrode 21 and the at least one second electrode 22 are provided in a same layer, and the bridge portion 23 connecting two portions of the first electrode 21 or the second electrode 22, and the at least one first additional electrode 31 and the at least one second additional electrode 32 of the additional electrode layer 3 are provided in the other layer, a thickness of the display panel may be reduced, which may improve the touch accuracy and the touch sensitivity of the touch electrode.

Optionally, orthographic projections of the plurality of first additional electrodes 31 on the display substrate 1 are distributed on a part of the first edge region or the whole first edge region of the orthographic projection of the corresponding first electrode 21 on the display substrate 1. That is, the plurality of first additional electrodes 31 may be distributed locally at the edge of the corresponding first electrode 21, or may be distributed at the entire edge of the corresponding first electrode 21. Compared with the case that the plurality of first additional electrodes 31 are distributed locally in the first edge region, the plurality of first additional electrodes 31 are distributed in the entire first edge region, so that the electric field of the first electrode 21 and the second electrode 22 in the edge region 211 may be better enhanced. Further, the mutual capacitance variation between the first electrode 21 and the second electrode 22 during the touch is increased, the touch sensitivity of the display panel is improved, and the problems are solved or avoided that the films on the touch electrode layer 2 become thicker or the load of the touch electrode layer 2 is larger, so that the mutual capacitance variation is very small and thus, it is difficult to detect whether the touch occurs, thereby improving the touch quality.

Optionally, orthographic projections of the plurality of second additional electrodes 32 on the display substrate 1 are distributed on a part of the second edge region or the whole first edge region of the orthographic projection of the corresponding second electrode 22 on the display substrate 1. That is, the plurality of second additional electrodes 32 may be distributed locally at the edge of the corresponding second electrode 22, or may be distributed at the entire edge of the corresponding second electrode 22. Compared with the case that the plurality of second additional electrodes 32 are distributed locally in the second edge region, the plurality of second additional electrodes 32 are distributed in the entire second edge region, so that the electric field of the first electrode 21 and the second electrode 22 in the edge region 211 may be better enhanced. Further, the mutual capacitance variation between the first electrode 21 and the second electrode 22 during the touch is increased, the touch sensitivity of the display panel is improved, and the problems are solved or avoided that the films on the touch electrode layer 2 become thicker or the load of the touch electrode layer 2 is larger, so that the mutual capacitance variation is very small and thus, it is difficult to detect whether the touch occurs, thereby improving the touch quality.

Optionally, the first additional electrode 31 may not necessarily be a linear electrode extending only in one direction (e.g., the Y direction in FIG. 2). The first additional electrode 31 may have a same shape as the first electrode 21, i.e., the orthographic projection of the first additional electrode 31 on the display substrate 1 is rectangular and overlaps the orthographic projection of the corresponding first electrode 21 on the display substrate 1. With such an arrangement, the electric field of the first electrode 21 and the second electrode 22 in the edge region 211 may be better enhanced. Further, the mutual capacitance variation between the first electrode 21 and the second electrode 22 during the touch is increased, the touch sensitivity of the display panel is improved, and the problems are solved or avoided that the films on the touch electrode layer 2 become thicker or the load of the touch electrode layer 2 is larger, so that the mutual capacitance variation is very small and thus, it is difficult to detect whether the touch occurs.

Optionally, the second additional electrode 32 may not necessarily be a linear electrode extending only in one direction (e.g., the Y direction in FIG. 2). The second additional electrode 32 may have a same shape as the second electrode 22, i.e., the orthographic projection of the second additional electrode 32 on the display substrate 1 is rectangular and overlaps the orthographic projection of the corresponding second electrode 22 on the display substrate 1. With such an arrangement, the electric field of the first electrode 21 and the second electrode 22 in the edge region 211 may be better enhanced. Further, the mutual capacitance variation between the first electrode 21 and the second electrode 22 during the touch is increased, the touch sensitivity of the display panel is improved, and the problems are solved or avoided that the films on the touch electrode layer 2 become thicker or the load of the touch electrode layer 2 is larger, so that the mutual capacitance variation is very small and thus, it is difficult to detect whether the touch occurs.

Optionally, as shown in FIG. 6, the touch electrode layer 2 includes a plurality of sub-units 200 arranged in an array (two rows and three columns shown in FIG. 6); each of the sub-units 200 includes at least one first electrode 21 and at least one second electrode 22, which include a plurality of first inter-digital electrodes and a plurality of second inter-digital electrodes, respectively, extending along the first direction Y and alternately arranged in the second direction X. The first direction Y is a column direction of the array; the second direction X is a row direction of the array.

In some embodiments of the present disclosure, each sub-unit 200 may include at least one first electrode 21 and at least one second electrode 22. However, the present disclosure is not limited thereto. In other embodiments of the present disclosure, each of the sub-units 200 may include a plurality of first electrodes 21 and a plurality of second electrodes 22, as shown in FIG. 6.

As shown in FIG. 5, the additional electrode layer 3 is shown including a plurality of bridge portions 23 and a plurality of first additional electrodes 31 and a plurality of second additional electrodes 32. Here, each bridge portion 23 and the corresponding first additional electrodes 31 and second additional electrodes 32 are arranged in one sub-unit 200.

In the embodiment of the present disclosure, the number of the first additional electrodes 31, the second additional electrodes 32, the first electrodes 21, and the second electrodes 22 is not particularly required. For example, the number of the first additional electrodes 31 and the second additional electrodes 32 shown in FIG. 5 is different from that shown in FIG. 1. The number of the first electrodes 21 and the second electrodes 22 of each of the sub-units 200 shown in FIG. 6 is different from that shown in FIG. 2.

Optionally, as shown in FIG. 6, the first electrodes 21 include a plurality of first electrode blocks 210, two adjacent first electrode blocks 210 are electrically connected through a connection electrode 221 disposed in a same layer as the first electrode blocks 210.

It should be noted that the pattern and arrangement of the touch electrode layer 2 are not limited to those shown in FIGS. 2 and 6, and any other patterns and arrangements of the touch electrode layer 2 may be applied to the present embodiment for realizing the mutual capacitance touch.

Optionally, as shown in FIGS. 1 and 5, the at least one bridge portion 23 includes one or more bridge portions 23, and an orthographic projection of each bridge portion 23 on the display substrate 1 is located at a position where the corresponding first electrode 21 or the second electrode 22 is disconnected; the second direction X is the row direction of the array. The number of the bridge portions 23 is determined according to the pattern and arrangement of the first electrodes 21 or the second electrodes 22.

Optionally, each first additional electrode 31 has a width in a range of 3 μm to 500 μm along the first direction Y or the second direction X; each second additional electrode 32 has a width in a range of 3 μm to 500 μm along the first direction Y or the second direction X. The first additional electrode 31 and the second additional electrode 32 have the above width, the electric field of the first electrode 21 and the second electrode 22 in the edge region 211 may be better enhanced. Further, the mutual capacitance variation between the first electrode 21 and the second electrode 22 during the touch is increased, the touch sensitivity of the display panel is improved, and the problems are solved or avoided that the films on the touch electrode layer 2 become thicker or the load of the touch electrode layer 2 is larger, so that the mutual capacitance variation is very small and thus, it is difficult to detect whether the touch occurs.

Optionally, the at least one first electrode 21 and the at least one second electrode 22 are mesh-shaped. The additional electrode layer 3 is mesh-shaped.

Optionally, as shown in FIG. 6, a mesh located at a boundary between the at least one first electrode 21 and the at least one second electrode 22 includes a plurality of metal wires, any two adjacent of which have a fracture 300 therebetween, such that the at least one first electrode 21 and the at least one second electrode 22 are electrically insulated from each other.

Optionally, the at least one first electrode 21 and the at least one second electrode 22 each is made of a titanium/aluminum/titanium laminated material; the at least one first electrode 21 and the at least one second electrode 22 each has a mesh line width in a range of 3 μm to 20 μm, and a thickness in a range of 0.1 μm to 10 μm.

Optionally, the additional electrode layer 3 is made of a titanium/aluminum/titanium laminated material; the additional electrode layer 3 has a mesh line width in a range of 3 μm to 20 μm, and a thickness in a range of 0.1 μm to 10 μm.

Optionally, the insulating layer 4 is made of a silicon nitride or silicon oxide material, and has a thickness in a range of 0.1 μm to 10 μm.

The layers have the above thickness, so that a thickness of the display panel is reduced and the touch performance of the display panel is improved.

Optionally, as shown in FIG. 6, the display panel further includes the plurality of first floating electrodes 10; the plurality of first floating electrodes 10 and the touch electrode layer 2 are disposed in a same layer, and are spaced from each other and insulated from each other; the plurality of first floating electrodes 10 are independently disposed and floated. That is, the plurality of first floating electrodes 10 are not electrically connected to any electrode in the display panel, and no electrical signal is fed into the plurality of first floating electrodes 10. The plurality of first floating electrodes 10 are mesh-shaped. In some embodiments of the present disclosure, the plurality of first floating electrodes 10 are separate electrodes that are not connected to any metal conductive layer. The capacitance between the touch electrode layer 2 and other conductive layers (such as a cathode) located below the touch electrode layer 2 may be reduced by providing the plurality of first floating electrodes 10, so that the load of the touch electrode layer 2 is reduced, and the problems are solved or avoided that the load of the touch electrode layer 2 is larger, so that the mutual capacitance variation is very small and thus, it is difficult to detect whether the touch occurs.

Finite element simulations were performed on a display panel in the related art and the display panel in the present embodiment, respectively. The laminated structure of the display panel in the present embodiment is shown in table 1. In the display panel in the related art, the disconnected two portions of the first electrode or the second electrode in the touch electrode layer 2 are connected together only through the bridge portion (i.e., the bridge portion connects two first electrode blocks or two second electrode blocks in the touch electrode layer 2 together), but the display panel in the related art does not include the first additional electrode and the second additional electrode in the embodiment of the present disclosure, and the other layers in the display panel in the related art have a same arrangement as the laminated structure of the display panel in the present embodiment. A simulation result is shown in table 2, from which it may be seen that compared to the display panel in the related art, in the display panel in the present embodiment, the sensing amount of the touch electrode is increased by 40 fF (i.e., by 38.6%), so that the anti-environmental-interference ability becomes stronger, and a resistance of the first electrode 21 is decreased from 27.8Ω to 21Ω, and the load of the first electrode 21 (a capacitance $C_S$ between the touch electrode layer and the additional electrode layer) is increased by only 6.6%, which still meets the requirement on driving parameters of the touch driving.

TABLE 1

Laminated structure

| Layers | Thickness (μm) | Dielectric constant |
| --- | --- | --- |
| Cover plate | 60 | 4.63 |
| Transparent adhesive layer | 50 | 3.5 |
| Polarizer | 67 | 2 |
| Planarization layer | 2 | 3 |
| Touch electrode | 0.3 | / |
| Insulating layer | 0.4 | 3 |
| Additional electrode layer | 0.2 | / |
| Buffer layer | 0.3 | 6 |
| Encapsulation layer | 13 | 6 |
| Cathode | 0.008 | / |

TABLE 2

Simulation result

| | Related art | Present embodiment |
| --- | --- | --- |
| Cs (pF) | 11.82 | 12.59 |
| Cm (pF) | 0.382 | 0.452 |
| ΔCm (pF) | 0.104 | 0.144 |
| ΔCm/Cm (%) | 27.22% | 31.8% |
| Cftx (pF) | 0.67 | 0.780 |
| Cfrx (pF) | 0.83 | 0.83 |
| Rs-Tx (Ω) | 27.8 | 21 |
| Rs-Rx (Ω) | 31.5 | 31.5 |

In table 2, $C_S$ is the load (capacitance) between the touch electrode layer and the cathode in the design in the related art; and $C_S$ is the load between the touch electrode layer and the additional electrode layer in the design in the present embodiment. As may be seen from table 2, in the embodiment, the load of the touch electrode layer is increased by a small amount by providing one additional electrode layer.

Cm is a basic mutual capacitance value of the touch electrode layer;

ΔCm is the mutual capacitance variation; Δ Cm/Cm is a rate of the mutual capacitance variation (i.e., touch sensitivity);

Cftx is a capacitance between a finger and the first electrode; Cfrx is a capacitance between the finger and the second electrode;

Rs-Tx is the resistance of the first electrode; Rs-Rx is the resistance of the second electrode (in simulation, no additional electrode layer (i.e. parallel metal layer) is provided to be connected to the second electrode, so that the resistance of the second electrode is not changed in the design in the related art and the design in the present embodiment).

Figures 7A, 7B, 7C:
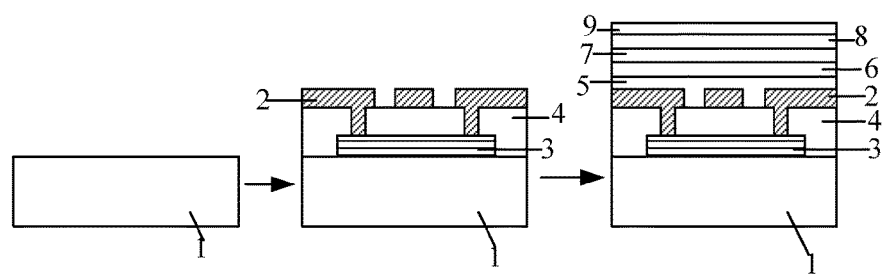
FIGS. 7a to 7c are schematic diagrams illustrating a process for manufacturing a display panel according to an embodiment of the present disclosure.

Based on the above structure of the display panel, the present embodiment further provides a method for manufacturing a display panel, as shown in FIGS. 7a to 7c, including steps of:

Step S01: forming the display substrate 1, as shown in FIG. 7a;

Step S01 includes forming the driving circuit, the array of sub-pixels, the encapsulation layer and the buffer layer on the substrate in sequence.

In the embodiment of the present disclosure, as shown in FIG. 7a, the display substrate 1 includes the substrate, and the driving circuit, the array of sub-pixels, the encapsulation layer and the buffer layer sequentially formed on the substrate.

Step S02: forming the additional electrode layer 3 and the touch electrode layer 2 on a light outgoing side of the display substrate;

Step S02 includes sequentially forming the additional electrode layer 3, the insulating layer 4, and the touch electrode layer 2 on the buffer layer, as shown in FIG. 7b.

Step S03: sequentially forming the planarization layer 5, the first transparent adhesive layer 6, the polarizer 7, the second transparent adhesive layer 8 and the cover plate 9 on the touch electrode layer 2, as shown in FIG. 7c.

Processes for forming layers in the manufacturing method all are the traditional processes, and are not described again.

Figure 9:
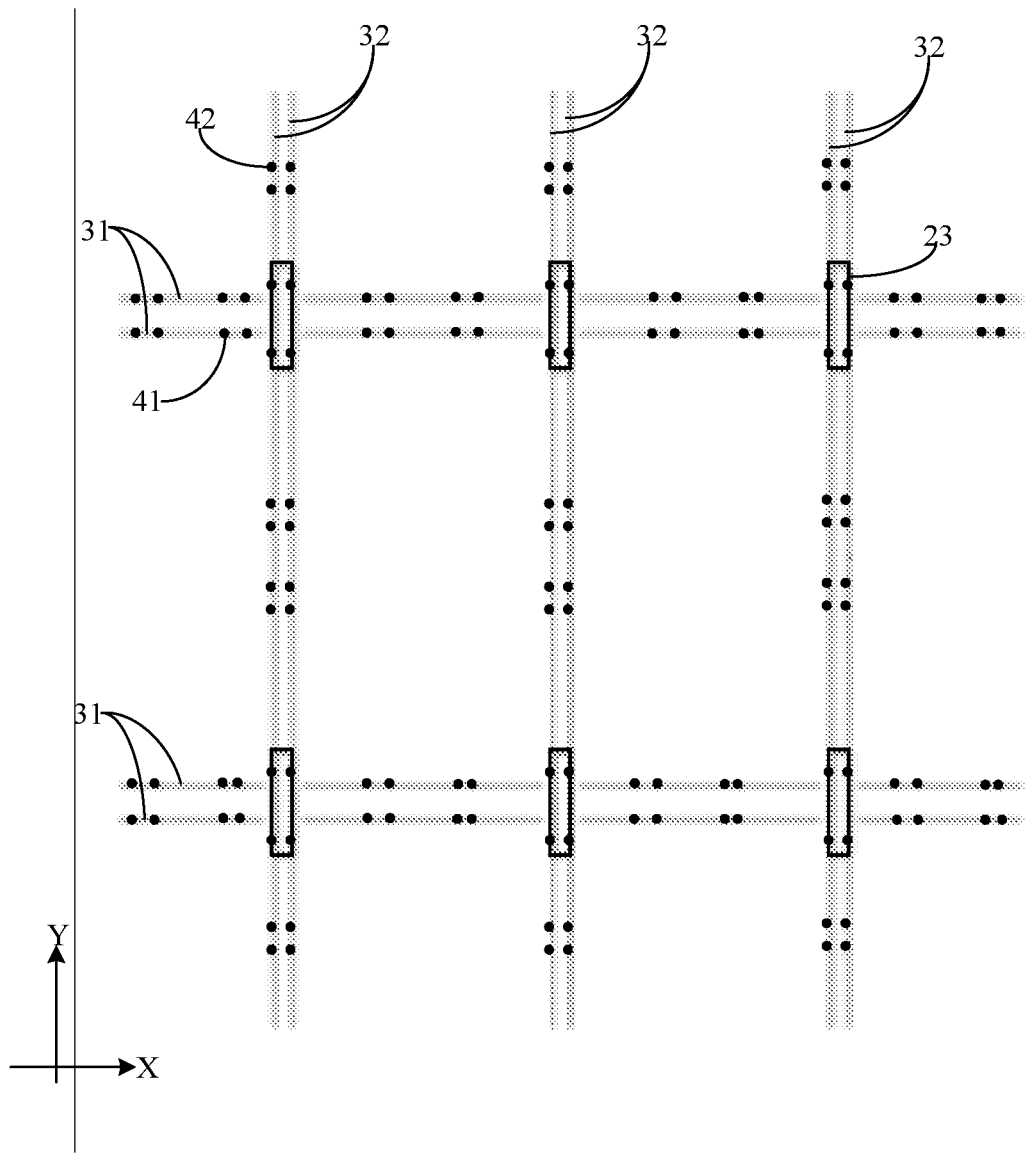
FIG. 9 is a schematic top view illustrating a structure of an additional electrode layer in a display panel according to another embodiment of the present disclosure.
Figure 10:
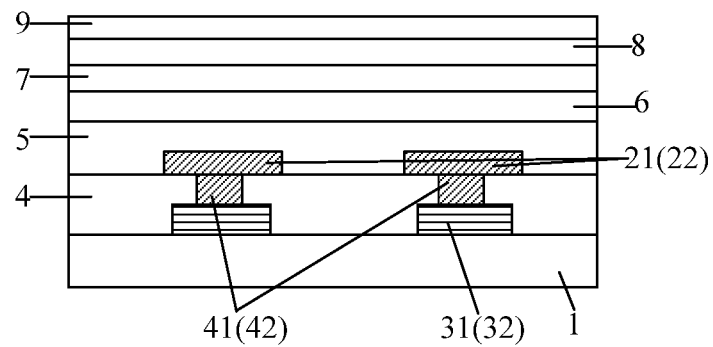
FIG. 10 is a schematic cross-sectional view illustrating a structure of a display panel according to another embodiment of the present disclosure.

The embodiment of the present disclosure also provides a display panel. In the present embodiment, as shown in FIGS. 8 to 10, the at least one bridge portion 23 is electrically connected to the corresponding first additional electrode 31 and spaced apart from the at least one second additional electrode 32; and the at least one first electrode 21 and the at least one second electrode 22 are mesh-shaped; the additional electrode layer is mesh-shaped.

Figure 8:
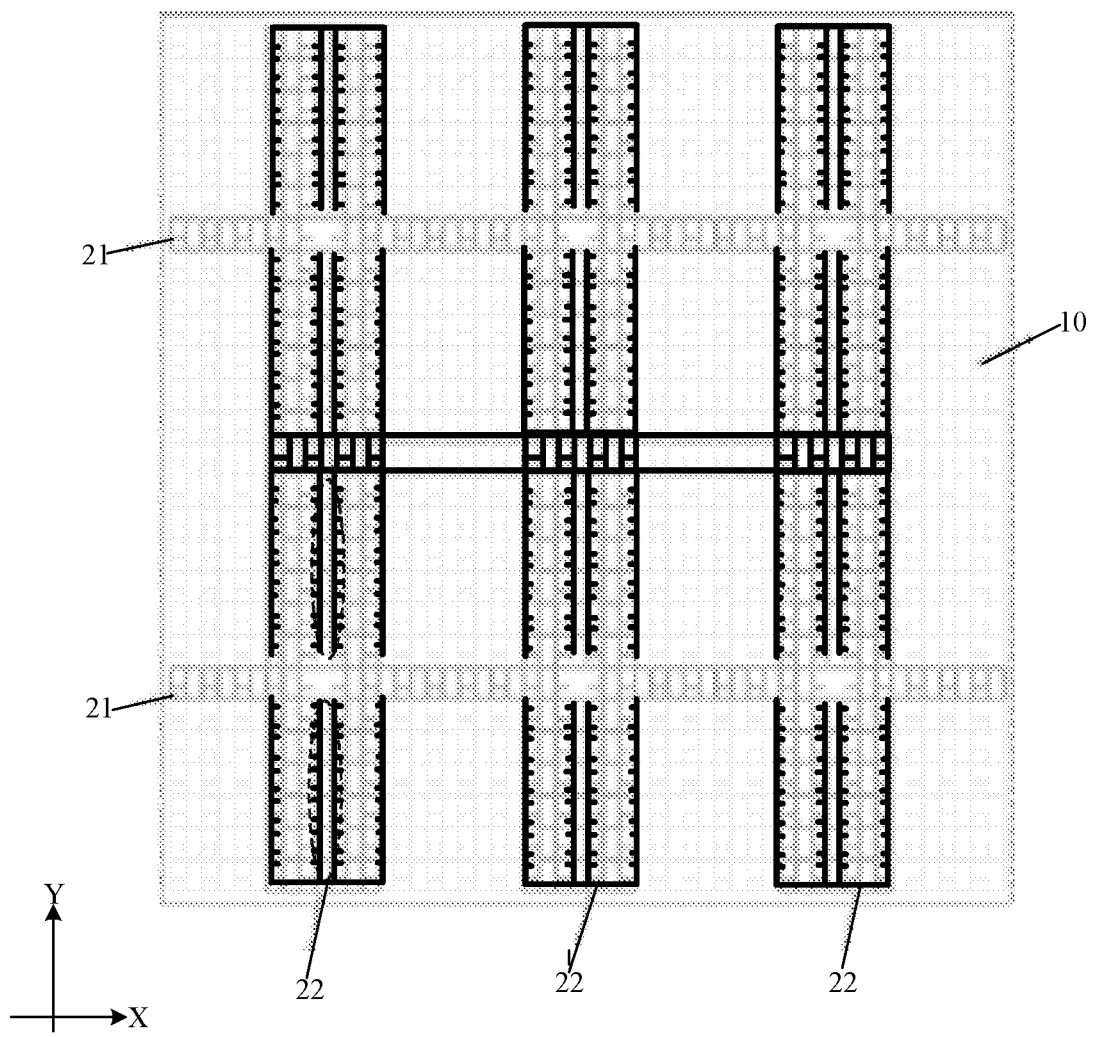
FIG. 8 is a schematic top view illustrating a structure of a touch electrode layer in a display panel according to another embodiment of the present disclosure.

In the present embodiment, the first electrode 21 and the second electrode 22 shown in FIG. 8 are the same as the first electrode 21 and the second electrode 22 shown in FIG. 6.

In the present embodiment, the sub-unit 200 includes a plurality of bridge portions 23 arranged in an array along the first direction Y and the second direction X, and the first additional electrodes 31 and the second additional electrodes 32 are disposed in rows or columns in which the bridge portions 23 are located. Each of the plurality of first additional electrodes 31 extends in the X direction; and each of the plurality of second additional electrodes 32 extends in the Y direction.

In the present embodiment, in one sub-unit 200 of the touch electrode layer, the at least one first additional electrode 31 includes a plurality of first mesh electrodes, each of which has an extending direction parallel to an extending direction of a transverse mesh line in the at least one first electrode 21 (i.e. the second direction X), and the orthographic projection of the at least one first additional electrode 31 on the display substrate 1 falls into the orthographic projection of the corresponding first electrode 21 on the display substrate 1. The at least one first additional electrode 31 is connected to the corresponding first electrode 21 through the plurality of first vias 41 in the insulating layer 4. The at least one first additional electrode 31 is connected to the corresponding bridge portion 23. In this way, the at least one first additional electrode 31 is connected in parallel with the corresponding first electrode 21, so that the overall resistance of the display panel is reduced, and further, the path resistance of the first electrode 21 is reduced along an extending direction of the first electrode 21, a difference between a product of a resistance and a capacitance at one end of the first electrode 21 and a product of a resistance and a capacitance at the other end of the first electrode 21 is reduced, the uniformity of electrical signals throughout the first electrode 21 is improved, thereby improving touch performances, such as linearity, accuracy, report rate, floating performance and the like, of the touch electrode.

In the present embodiment, in one sub-unit 200 of the touch electrode layer, the at least one second additional electrode 32 includes a plurality of second mesh electrodes, each of which has an extending direction parallel to an extending direction of a longitudinal mesh line in the at least one second electrode 22 (i.e. the first direction Y), and the orthographic projection of the at least one second additional electrode 32 on the display substrate 1 falls into the orthographic projection of the corresponding second electrode 22 on the display substrate 1. The at least one second additional electrode 32 is disconnected at a position where the at least one second additional electrode 32 intersects with the corresponding first additional electrode 31. The at least one second additional electrode 32 is connected to the corresponding second electrode 22 through the plurality of second vias 42 in the insulating layer 4. In this way, the at least one second additional electrode 32 is connected in parallel with the corresponding second electrode 22, so that the overall resistance of the display panel is reduced, and further, the path resistances of the first electrode 21 and the second electrode 22 are reduced along an extending direction of the second electrode 22, a difference between a product of a resistance and a capacitance at one end of the second electrode 22 and a product of a resistance and a capacitance at the other end of the second electrode 22 is reduced, the uniformity of electrical signals throughout the second electrode 22 is improved, thereby improving touch performances, such as linearity, accuracy, report rate, floating performance and the like, of the touch electrode.

In some embodiments of the present disclosure, the at least one first additional electrode 31 is connected in parallel with the corresponding first electrode 21 through the plurality of first vias 41 in the insulating layer 4. In some embodiments of the present disclosure, the plurality of first vias 41 are provided in the insulating layer 4, and the reference number 41 shown in FIG. 9 merely represents a positional relationship between the first via and the additional electrode layer 3.

In some embodiments of the present disclosure, the at least one second additional electrode 32 is connected in parallel with the corresponding second electrode 22 through the plurality of second vias 42 in the insulating layer 4. In some embodiments of the present disclosure, the plurality of second vias 42 are provided in the insulating layer 4, and the reference number 42 shown in FIG. 9 merely represents a positional relationship between the second via and the additional electrode layer 3.

Figure 11:
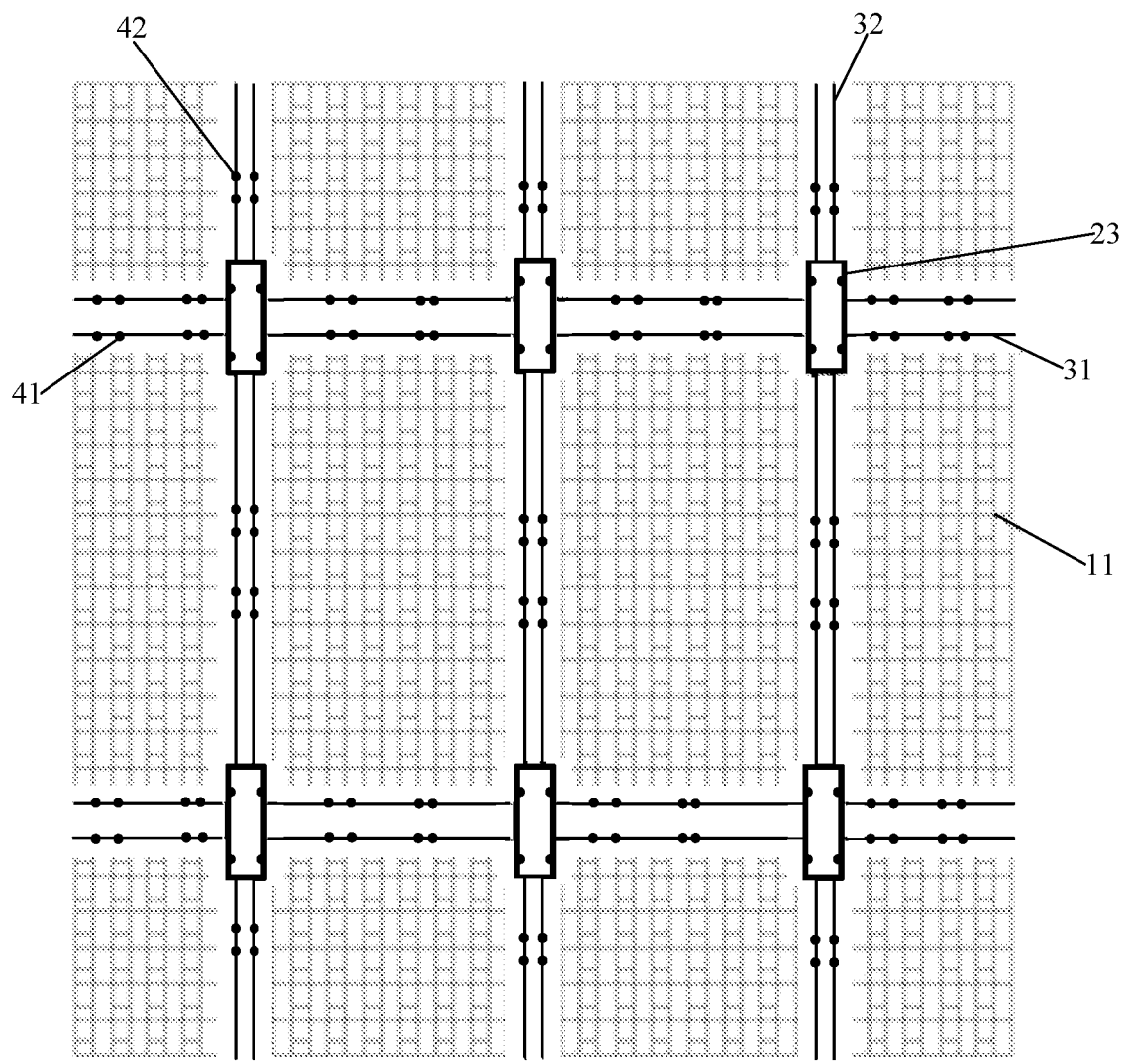
FIG. 11 is a schematic top view of an electrode of an additional electrode layer in a display panel according to another embodiment of the present disclosure.

In the present embodiment, as shown in FIG. 11, the display panel further includes at least one second floating electrode 11; the at least one second floating electrode 11 and the additional electrode layer are disposed in a same layer, and are insulated from each other; an orthographic projection of the at least one second floating electrode 11 and the additional electrode layer on the display substrate 1 overlaps an orthographic projection of the plurality of first floating electrodes 10 and the touch electrode layer on the display substrate 1. The at least one second floating electrode 11 is provided so that a poor visual effect due to the light reflected by the additional electrode layer at sides may be avoided when viewing at a side viewing angle, and further, the problem may be avoided that metal wires of the additional electrode layer are visible when viewing at the side viewing angle.

Other structures of the display panel and manufacturing methods for the display panel in the present embodiment are the same as those in the above embodiment, and are not described herein again.

In the display panel provided in the present embodiment, the additional electrode layer is disposed in a layer different from the touch electrode layer, and the orthographic projection of the at least one first additional electrode on the display substrate at least partially overlaps the orthographic projection of the corresponding first electrode on the display substrate, and the at least one first additional electrode in the additional electrode layer is connected in parallel with the corresponding first electrode, and/or, the at least one second additional electrode in the additional electrode layer is connected in parallel with the corresponding second electrode, so that the number of electric wires of the first electrode and the second electrode at the edge region is increased, so that an electric field of the first electrode and the second electrode at the edge region is enhanced, and further, the mutual capacitance variation between the first electrode and the second electrode during the touch is increased. Furthermore, the touch sensitivity of the display panel is improved, and the problems are solved or avoided that the films on the touch electrode layer become thicker or the load of the touch electrode layer is larger, so that the mutual capacitance variation is very small and thus, it is difficult to detect whether the touch occurs. On the other hand, the at least one first additional electrode is connected in parallel with the corresponding first electrode, and/or, the at least one second additional electrode is connected in parallel with the corresponding second electrode, so that the overall resistance of the display panel is reduced, and further, the path resistances of the first electrode and the second electrode are reduced along an extending direction of the first electrode and/or the second electrode, a difference between a product of a resistance and a capacitance at one end of the first electrode and/or the second electrode and a product of a resistance and a capacitance at the other end of the first electrode and/or the second electrode is reduced, the uniformity of electrical signals throughout the first electrode and/or the second electrode is improved, thereby improving touch performances, such as linearity, accuracy, report rate, floating performance and the like, of the touch electrode.

The embodiment of the present disclosure further provides a display apparatus, which includes the display panel in the above embodiment.

The display panel in the above embodiment is provided, such that the mutual capacitance variation of touch electrodes of the display apparatus during the touch is increased, the touch sensitivity of the display apparatus is improved, and the problems, that the film on the touch electrode is thicker or the load of the touch electrode is larger and therefore the mutual capacitance variation is very small and it is difficult to detect whether the touch occurs, of the display apparatus are solved or avoided, thereby improving the touch quality of the display apparatus.

The display apparatus provided by the embodiment of the present disclosure may be any product or component with a display function, such as an OLED panel, an OLED television, an LED panel, an LED television, a Micro LED panel, a Micro LED television, a display, a mobile phone, a navigator and the like.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:
1. A display panel, comprising:
a display substrate; and
a touch electrode layer, which is arranged on a light outgoing side of the display substrate, and comprises at least one first electrode and at least one second electrode, which intersect with each other and are insulated from each other;

wherein the display panel further comprises:

an additional electrode layer, which is arranged in a layer different from the touch electrode layer and comprises at least one first additional electrode; wherein an orthographic projection of the at least one first additional electrode on the display substrate at least partially overlaps an orthographic projection of the at least one first electrode on the display substrate; and an insulating layer, which is arranged between the additional electrode layer and the touch electrode layer; wherein the at least one first additional electrode is connected to the at least one first electrode through at least one first via in the insulating layer;

the additional electrode layer further comprises at least one second additional electrode, which is insulated from the at least one first additional electrode; and an orthographic projection of the at least one second additional electrode on the display substrate at least partially overlaps the orthographic projection of the at least one second electrode on the display substrate, and the at least one second additional electrode is connected to the at least one second electrode through at least one second via in the insulating layer; and the orthographic projection of an edge of each first electrode of the at least one first electrode, close to an adjacent second electrode of this first electrode, on the display substrate comprises a first edge region, and the orthographic projection of a first addition electrode of the at least one first additional electrode, corresponding to this first electrode, on the display substrate overlaps the first edge region; and the orthographic projection of an edge of each second electrode of the at least one second electrode, close to an adjacent first electrode of this second electrode, on the display substrate comprises a second edge region, and the orthographic projection of a second additional electrode of the at least one second additional electrode, corresponding to this second electrode, on the display substrate overlaps the second edge region; and the additional electrode layer further comprises at least one bridge portion; and the at least one bridge portion is connected to the at least one first additional electrode; the at least one first electrode comprises two first electrode blocks at both sides of one of the at least one second electrode; the at least one bridge portion electrically connects the two first electrode blocks together through at least two third vias in the insulating layer;

or the at least one bridge portion is connected to the at least one second additional electrode; the at least one second electrode comprises two second electrode blocks at both sides of one of the at least one first electrode; the at least one bridge portion electrically connects the two second electrode blocks together through at least two third vias in the insulating layer.

2. The display panel of claim 1, wherein the at least one first via comprises a plurality of first vias, and orthographic projections of the plurality of first vias on the display substrate are uniformly distributed in an area where the orthographic projection of the at least one first additional electrode on the display substrate overlaps the orthographic projection of the at least one first electrode on the display substrate.

3. The display panel of claim 2, wherein the at least one second via comprises a plurality of second vias, and orthographic projections of the plurality of second vias on the display substrate are uniformly distributed in an area where the orthographic projection of the at least one second additional electrode on the display substrate overlaps the orthographic projection of the at least one second electrode on the display substrate.

4. The display panel of claim 3, wherein the at least one first additional electrode comprises a plurality of first additional electrodes, and orthographic projection of the plurality of first additional electrodes on the display substrate are distributed in a part or an entirety of the first edge region of the orthographic projection of the at least one first electrode on the display substrate.

5. The display panel of claim 4, wherein the at least one second additional electrode comprises a plurality of second additional electrodes, and orthographic projection of the plurality of second additional electrodes on the display substrate are distributed on a part or an entirety of the second edge region the orthographic projection of the at least one second electrode on the display substrate.

6. The display panel of claim 5, wherein the orthographic projection of the at least one first additional electrode on the display substrate fully overlaps the orthographic projection of the at least one first electrode on the display substrate.

7. The display panel of claim 6, wherein the orthographic projection of the at least one second additional electrode on the display substrate fully overlaps the orthographic projection of the at least one second electrode on the display substrate.

8. The display panel of claim 7, wherein the touch electrode layer comprises a plurality of sub-units arranged in an array along a first direction and a second direction; and each of the plurality of sub-units comprises at least one first electrode and at least one second electrode, which comprise a plurality of first inter-digital electrodes and a plurality of second inter-digital electrodes, respectively, extending along the first direction and alternately arranged in the second direction.

9. The display panel of claim 8, wherein for each of the plurality of sub-units, the additional electrode layer is provided with a corresponding bridge portion of the at least one bridge portion.

10. The display panel of claim 9, wherein the at least one first electrode and the at least one second electrode are mesh-shaped; the additional electrode layer is mesh-shaped.

11. The display panel of claim 10, wherein each of the at least one first electrode and the at least one second electrode comprises a titanium/aluminum/titanium laminated material.

12. The display panel of claim 11, wherein the additional electrode layer comprises a titanium/aluminum/titanium laminated material.

13. The display panel of claim 12, wherein the insulating layer comprises a silicon nitride material or a silicon oxide material.

14. The display panel of claim 13, wherein
a mesh located at a boundary between the at least one first electrode and the at least one second electrode comprises a plurality of metal wires, any two adjacent of which have a fracture therebetween, such that the at least one first electrode and the at least one second electrode are electrically insulated from each other.

15. The display panel of claim 14, further comprising at least one first floating electrode;
wherein the at least one first floating electrode and the touch electrode layer are in a same layer, and spaced apart from each other and insulated from each other; and
wherein the at least one first floating electrode is floated.

16. The display panel of claim 15, further comprising at least one second floating electrode;
wherein the at least one second floating electrode and the additional electrode layer are in a same layer, and insulated from each other;
an orthographic projection of the at least one second floating electrode and the additional electrode layer on the display substrate overlaps an orthographic projection of the at least one first floating electrode and the touch electrode layer on the display substrate.

17. A display apparatus, comprising the display panel of claim 1.

18. The display panel of claim 1, wherein
the at least one second via comprises a plurality of second vias, and
orthographic projections of the plurality of second vias on the display substrate are uniformly distributed in an area where the orthographic projection of the at least one second additional electrode on the display substrate overlaps the orthographic projection of the at least one second electrode on the display substrate.

19. The display panel of claim 1, wherein
the at least one first additional electrode comprises a plurality of first additional electrodes, and
orthographic projection of the plurality of first additional electrodes on the display substrate are distributed in a part or an entirety of the first edge region of the orthographic projection of the at least one first electrode on the display substrate.

20. The display panel of claim 1, wherein
the at least one second additional electrode comprises a plurality of second additional electrodes, and
orthographic projection of the plurality of second additional electrodes on the display substrate are distributed on a part or an entirety of the second edge region the orthographic projection of the at least one second electrode on the display substrate.

* * * * *